United States Patent
Phillips

[15] 3,694,434
[45] Sept. 26, 1972

[54] 2,6-DIORGANO-1,5-DITHIA-2,6-DIAZACYCLOOCTANE-3,4,7,8-TETRAONES AND THEIR MANUFACTURE

[72] Inventor: Wendell Gary Phillips, Olivette, Mo.
[73] Assignee: Monsanto Company, St. Louis, Mo.
[22] Filed: Oct. 18, 1971
[21] Appl. No.: 190,257

[52] U.S. Cl. ............... 260/239.3 R, 71/90, 71/92, 260/543 H, 424/244
[51] Int. Cl. ............................................. C07d 93/36
[58] Field of Search ............................. 260/239.3 R

[56] References Cited
FOREIGN PATENTS OR APPLICATIONS
1,195,317  6/1965  Germany ............ 260/239.3 R Primary Examiner—Henry R. Jiles
Assistant Examiner—Robert T. Bond
Attorney—Neal E. Willis et al.

[57] ABSTRACT

2,6-Diorgano-1,5-dithia-2,6-diazacyclooctane-3,4,7,8-tetranones are prepared from oxamoyl sulfenyl chlorides by elimination of HCl in the presence of an HCl scavenger. These compounds are pesticidally active and particularly useful as pre-emergent herbicides.

16 Claims, No Drawings

2,6-DIORGANO-1,5-DITHIA-2,6-DIAZACYCLOOCTANE-3,4,7,8-TETRAONES AND THEIR MANUFACTURE

This invention relates to 2,6-diorgano-1,5-dithia-2,6-diazacyclooctane-3,4,7,8-tetraones of the formula

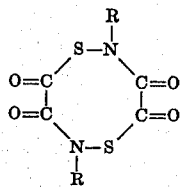

and their manufacture from the corresponding oxamoyl sulfenyl chlorides of the formula

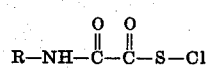

wherein R is alkyl of from one to six carbons, alkoxyalkyl of from two to eight carbons, benzyl, phenyl, substituted phenyl wherein the ring substituents thereof total from one to three same or different substituents selected from the group of substituents consisting of alkyl of from one to six carbons, lower alkoxy, halo, nitro, cyano, and trihalomethyl, provided that the number of nitro substituents be from zero to two, and provided that the number of said substituents in the 2 and 6 positions on the ring be from zero to one, substituted benzyl wherein the substituents are in any position on the phenyl ring but otherwise as defined for substituted phenyl.

Examples of alkyl having from one to six carbons include methyl, ethyl, propyl, butyl, pentyl, hexyl and the various isomeric forms thereof including cyclopentyl and cyclohexyl.

Lower alkoxy have from one to five carbons. Examples of alkoxy include methoxy, ethoxy, propoxy, butoxy, pentoxy and the various isomeric forms thereof.

Examples of alkoxyalkyl of from two to eight carbons include, but are not limited to, propoxymethyl, butoxybutyl, butoxyethyl, methoxymethyl, and ethoxypropyl.

Halo is a halogen selected from the group consisting of fluorine, chlorine, bromine and iodine.

Examples of substituted phenyl include, but are not limited to, phenyl groups of the formula

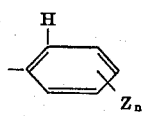

wherein Z is halo, trihalomethyl, cyano, nitro, alkyl of from one through six carbons or lower alkoxy, and n is an integer from one to three, provided that the number of nitro substituents be from zero to two.

The compounds of this invention are conveniently and efficiently prepared by elimination of hydrogen chloride from an oxamoyl sulfenyl chloride of the formula

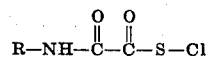

wherein R has the aforementioned significance in the presence of an HCl scavenger. The reaction is postulated to proceed as follows:

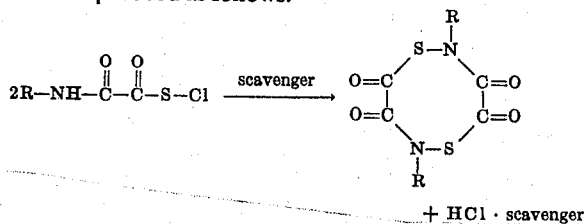

The HCl scavenger must be present in at least an equimolecular amount as compared to the substituted sulfenyl chloride. Generally not more than ten times the equimolecular amount of scavenger is useful although the maximum amount is not critical. The type of scavenger is not critical to the invention so long as it does not interfere with the cyclization of the oxamoyl sulfenyl chloride. Examples of scavengers are trialkyl amines and sodium bicarbonate dissolved in water. Preferred trialkylamines have from two through five carbons in the alkyl group. When sodium bicarbonate dissolved in water is the HCl scavenger, the reaction mass is a two-phase system. Agitation during the reaction is necessary to keep the aqueous phase which contains the sodium bicarbonate, the active HCl scavenger component, in intimate contact with the organic phase containing the oxamoyl sulfenyl chloride and the desired reaction product. When a trialkyl amine scavenger is used, the amount of scavenger generally ranges from about an equimolecular amount to about twice the equimolecular amount. When aqueous sodium bicarbonate is the scavenger, the amount of sodium bicarbonate ranges from about an equimolecular amount to about ten times the equimolecular amount. The amount of water in which the sodium bicarbonate is dissolved is not critical to the conduct of the reaction.

The reaction mass may consist only of the aforedescribed reactants and their reaction products or it may contain other components in addition such as diluents, other inert materials and solvents, i.e., common organic liquids which are inert under the reaction conditions and which may dissolve one or more of the reactants or products of the reaction, which solvents are exemplified by, but not limited to, aliphatic hydrocarbons, such as pentane, hexane, mineral spirits, etc., aromatics such as benzene, toluene, xylenes, etc., ethers such as diethyl ether, diisopropyl ether, petroleum ether, etc., esters such as methyl acetate, ethyl acetate, propyl acetate, etc., and other organics such as tetrahydrofuran, etc. The hydrochloride salt by-product is generally not soluble in the above solvents. Accordingly, the insoluble salt usually forms a precipitate in the reaction mass and may be easily removed by filtration. When filtration is not desired, or when sodium bicarbonate dissolved in water is used as the HCl scavenger, or when the salt is soluble in the solvent, the salt may be readily removed from the reaction mass by extraction with water.

The reaction is normally carried out at a temperature above the freezing point of the system but preferably not above the boiling point of the system. More preferably, the reaction is carried out at temperatures of from about 0° C. to about 60° C. The reaction is most conveniently carried out at room temperature, about 23° C., in the presence of an organic solvent. The reaction is usually carried out at atmospheric pressure, but higher or lower pressures may be utilized if equipment and other factors favor such higher or lower pressures. The reaction may be carried out in an open vessel or under reflux.

The compounds of this invention are useful as biocides. Exemplary of such biocidal uses for these products is the control of nematodes, arachnids, arthropods and insects as well as eradication of noxious weeds. These compounds are particularly useful as pre-emergent and contact herbicides.

Pre-emergent and contact herbicidal compounds are useful in the selective killing of weeds in crops. In using the compounds of the present invention as pre-emergent and contact herbicides, the compounds can be used alone or in combination with a material referred to in the art as an adjuvant in liquid or solid form. Herbicidal formulations are prepared by admixing the compound which is the active ingredient of the formulation with an adjuvant including diluents, extenders, carriers and conditioning agents to provide compositions in the form of finely divided particulate solids, granules, pellets, solutions, dispersions or emulsions. Thus, the active ingredient can be used with an adjuvant such as a finely divided particulate solid, a liquid of organic origin, water, a wetting agent, a dispersing agent, an emulsifying agent or any suitable combination of these. The herbicidal formulations usually contain from about 0.01 percent to about 99 percent by weight of the active ingredient. Application of these formulations to the soil or growth media can be carried out by simply admixing with the soil, by applying to the surface of the soil and thereafter dragging or discing into the soil to the desired depth, or by employing a liquid carrier to accomplish the penetration and impregnation. The application of liquid and particulate solid herbicidal formulations to the surface of soil or to above ground portions of plants can be carried out by conventional methods, e.g., power dusters, boom and hand sprayers and spray dusters. The formulations can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the active ingredients.

The exact amount of active ingredient to be employed is dependent upon the response desired in the plant as well as such other factors as the plant species and stage of development thereof, the specific soil and depth at which the active ingredients are distributed in the soil and the amount of rainfall, as well as the specific active ingredient employed. In foliar treatment, the active ingredients are applied in amounts from about 1 to about 50 or more pounds per acre. In applications to soil for the control of the growth of germinant seeds, germinative seeds, emerging seedlings and established vegetation, the active ingredients are applied in amounts from about 0.1 to about 25 or more pounds per acre. It is believed that one skilled in the art can readily determine from the teachings of this specification the general procedure for any application.

Manufacture of oxamoyl sulfenyl chlorides, used as starting materials in the preparation of the compounds of the present invention, is taught in my prior U.S. Pat. application, Ser. No. 177,096 filed Sept. 1, 1971, entitled "Oxamoyl Sulfenyl Chlorides and Their Manufacture."

As illustrative of this invention, but not limitative thereof, is the following:

EXAMPLE 1

To a suitable reaction vessel equipped with an agitator is charged approximately 200 milliliters (ml.) of dichloromethane. Approximately 10 grams (g.), about 0.035 moles, of meta-(trifluoromethyl)phenyloxamoyl sulfenyl chloride is added and dissolved in the dichloromethane. Approximately 5 g. of sodium bicarbonate is dissolved in about 200 ml. of water and the aqueous solution is then added. After the mass is stirred for about 1 hour at ambient room temperature, about 23° C, the mass is allowed to stand. It separates into two layers. The aqueous layer is removed in a separatory funnel. The remaining organic layer is dried over magnesium sulfate. The dichloromethane is then removed from the dried remaining organic layer by vacuum distillation. An oil remains which is dissolved in about 100 ml. of diethyl ether. A small amount of insoluble particles which remain are removed by filtration and discarded. The diethyl ether is removed by vacuum distillation leaving a residual oil. About 50 ml. of dichloromethane is added and a white solid precipitate appears. The precipitate is removed by filtration and air-dried. The white solid is found to have a melting point of about 170 to 174° C. and is identified by and nuclear magnetic resonance, infrared analysis and molecular weight determination in benzene as 2,6-di-[meta-(trifluoromethyl)phenyl]-1,5-dithia-2,6-diaza-cyclooctane-3,4,7,8-tetraone

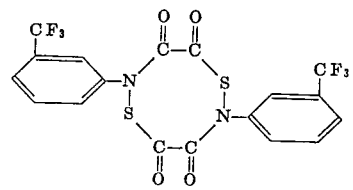

Calculated for $C_{18}H_8F_6N_2O_4S_2$: C, 43.73; H, 1.63; N, 5.67

Found: C, 43.46; H, 1.75; N, 5.41

EXAMPLE 2

To a suitable reaction vessel equipped with an agitator is charged approximately 500 ml. of dichloromethane. Approximately 10 g., about 0.04 moles, of para-chlorophenyloxamoyl sulfenyl chloride is added to and dissolved in the dichloromethane. Approximately 5 g. of sodium bicarbonate is dissolved in about 300 ml. of water. This aqueous solution is then added. The reaction mass is stirred vigorously overnight. The reaction mass is allowed to separate into two phases. The aqueous phase is removed in a separatory funnel and discarded. The remaining organic phase which contains solid floating particles is dried over magnesium sulfate. The dichloromethane is removed from the dried organic portion by vacuum distillation leaving 50 ml. of a residual oil containing solid particles. The solid is removed from the liquid by filtration and washed with diethyl ether. The light yellow solid is found to have a melting point of about 213° to 214° C., to be soluble in acetone and ethanol and to be insoluble in water and is identified by elemental analysis as 2,6-di-(para-chlorophenyl)- 1,5-dithia-2,6-diazacyclooctane-3,4,7,8-tetraone

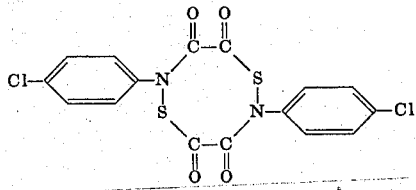

Calculated for $C_{16}H_8Cl_2N_2O_4S_2$: C, 44.97; H, 1.89; N, 6.56
Found: C, 45.00; H, 2.05; N, 6.59

EXAMPLES 3 AND 4

The procedure of Example 1 is followed except that in place of 5.0 g. of sodium bicarbonate dissolved in water, about 0.05 moles of the specified trialkyl amine is dissolved in dichloromethane and added to the reaction mass. The precipitate which forms is removed after stirring for about one hour. The remaining liquid portion is processed in the manner of the organic layer of Example 1 and the product of Example 1 is obtained.

Example 3 — Triethyl amine.
Example 4 — Tributyl amine.

EXAMPLE 5

The procedure of Example 3 is followed except that, instead of removing the first precipitate which forms after completion of the triethyl amine addition by filtration, after stirring for about one hour, about 200 ml. of water are added to the mass and the mass is stirred until the precipitate is no longer visible. The mass then separates into an organic and an aqueous phase, the aqueous phase, which contains the dissolved hydrogen chloride amine salt, is removed and the organic phase is then processed as in Example 1. The product of Example 1 is obtained.

EXAMPLES 6 THROUGH 33

The procedure of Example 1 is followed except that, in place of about 10 g. of meta-(trifluoromethyl)phenyloxamoyl sulfenyl chloride, an approximately equimolecular amount of compound A is charged and product B is obtained:

EXAMPLE 6

A methyloxamoyl sulfenyl chloride
B 2,6-dimethyl-1,5-dithia-2,6-diazacyclooctane-3,4,7,8-tetraone

EXAMPLE 7

A cyclohexyloxamoyl sulfenyl chloride
B 2,6-dicyclohexyl-1,5-dithia-2,6-diazacyclooctane-3,4,7,8-tetraone

EXAMPLE 8

A isopropyloxamoyl sulfenyl chloride
B 2,6-diisopropyl-1,5-dithia-2,6-diazacyclooctane-3,4,7,8-tetraone

EXAMPLE 9

A tert.-butyloxanoyl sulfenyl chloride
B 2,6-ditert.-butyl-1,5-dithia-2,6-diazacyclooctane-3,4,7,8-tetraone

EXAMPLE 10

A isopentyloxamoyl sulfenyl chloride
B 2,6-diisopentyl-1,5-dithia-2,6-diazacyclooctane-3,4,7,8-tetraone

EXAMPLE 11

A benzyloxamoyl sulfenyl chloride
B 2,6-dibenzyl-1,5-dithia-2,6-diazacyclooctane-3,4,7,8-tetraone

EXAMPLE 12

A 3,4-dichlorobenzyloxamoyl sulfenyl chloride
B 2,6-di(3,4-dichlorobenzyl)-1,5-dithia-2,6-diazacyclooctane-3,4,7,8-tetraone

EXAMPLE 13

A 2,6-dimethoxybenzyloxamoyl sulfenyl chloride
B 2,6-di(2,6-dimethoxybenzyl)-1,5-dithia-2,6-diazacyclooctane-3,4,7,8-tetraone

EXAMPLE 14

A 3,4,5-trifluorobenzyloxamoyl sulfenyl chloride
B 2,6-di(3,4,5-trifluorobenzyl)-1,5-dithia-2,6-diazacyclooctane-3,4,7,8-tetraone

EXAMPLE 15

A para-nitrobenzyloxamoyl sulfenyl chloride
B 2,6-di(para-nitrobenzyl)-1,5-dithia-2,6-diazacyclooctane-3,4,7,8-tetraone

EXAMPLE 16

A phenyloxamoyl sulfenyl chloride
B 2,6-diphenyl-1,5-dithia-2,6-diazacyclooctane-3,4,7,8-tetraone

EXAMPLE 17

A meta-(tribromomethyl)phenyloxamoyl sulfenyl chloride
B 2,6-di[meta-(tribromomethyl)phenyl]-1,5-dithia-2,6-diazacyclooctane-3,4,7,8-tetraone

EXAMPLE 18

A para-(trichloromethyl)phenyloxamoyl sulfenyl chloride
B 2,6-di[para-(trichloromethyl)phenyl-1,5-dithia-2,6-diazacyclooctane-3,4,7,8-tetraone

EXAMPLE 19

A 3,4-di(trifluoromethyl)phenyloxamoyl sulfenyl chloride
B 2,6-di[3,4-di(trifluoromethyl)phenyl]-1,5-dithia-2,6-diazacyclooctane-3,4,7,8-tetraone

EXAMPLE 20

A isopropoxyethyloxamoyl sulfenyl chloride
B 2,6-diisopropoxyethyl-1,5-dithia-2,6-diazacyclooctane-3,4,7,8-tetraone

EXAMPLE 21

A butoxybutyloxamoyl sulfenyl chloride
B 2,6-dibutoxybutyl-1,5-dithia-2,6-diazacyclooctane-3,4,7,8-tetraone

EXAMPLE 22

A methoxymethyloxamoyl sulfenyl chloride
B 2,6-dimethoxymethyl-1,5-dithia-2,6-diazacyclooctane-3,4,7,8-tetraone

EXAMPLE 23

A ortho-cyanophenyloxamoyl sulfenyl chloride
B 2,6-di(ortho-cyanophenyl)-1,5-dithia-2,6-diazacyclo-octane-3,4,7,8-tetraone

EXAMPLE 24

A 3-methoxy-p-tolyloxamoyl sulfenyl chloride
B 2,6-di(3-methoxy-p-tolyl)-1,5-dithia-2,6-diazacyclo-octane-3,4,7,8-tetraone

EXAMPLE 25

A ortho-iodophenyloxamoyl sulfenyl chloride
B 2,6-di(ortho-iodophenyl)-1,5-dithia-2,6-diazacyclo-octane-3,4,7,8-tetraone

EXAMPLE 26

A 2,4,5-trichlorophenyloxamoyl sulfenyl chloride
B 2,6-di(2,4,5-trichlorophenyl)-1,5-dithia-2,6-diazacyclooctane-3,4,7,8-tetraone

EXAMPLE 27

A para-butoxyphenyloxamoyl sulfenyl chloride
B 2,6-di(para-butoxyphenyl)-1,5-dithia-2,6-diazacyclo-octane-3,4,7,8-tetraone

EXAMPLE 28

A 2,5-diethoxyphenyloxamoyl sulfenyl chloride
B 2,6-di(2,5-diethoxyphenyl)-1,5-dithia-2,6-diazacyclo-octane-3,4,7,8-tetraone

EXAMPLE 29

A 3,5-diisopropylphenyloxamoyl sulfenyl chloride
B 2,6-di(3,5-diisopropylphenyl)-1,5-dithia-2,6-diazacyclooctane-3,4,7,8-tetraone

EXAMPLE 30

A 3,4,5-triethylphenyloxamoyl sulfenyl chloride
B 2,6-di(3,4,5-triethylphenyl)-2,6-diaza-1,5-dithia-2,6-diazacyclooctane-3,4,7,8-tetraone

EXAMPLE 31

A para-hexylphenyloxamoyl sulfenyl chloride
B 1 2,6-di(para-hexylphenyl)-1,5-dithia-2,6-diazacyclooctane-3,4,7,8-tetraone

EXAMPLE 32

A meta-cyclopentylphenyloxamoyl sulfenyl chloride
B 2,6-di(meta-cylcopentylphenyl)-1,5-dithia-2,6-diazacyclooctane-3,4,7,8-tetraone

EXAMPLE 33

A meta-nitrophenyloxamoyl sulfenyl chloride
B 2,6-di(meta-nitrophenyl)-1,5-dithia-2,6-diazacyclooctane-3,4,7,8-tetraone

EXAMPLE 34

Contact herbicidal activity of representative compounds of this invention is determined by the following procedure:

The compound to be tested is applied in spray form to plants of a given age of several grasses and broadleaf species. After the plants are the desired age, each aluminum pan of plants is sprayed with a given volume of a 0.2 percent concentration solution of the candidate chemical, corresponding to a rate of approximately 3.6 lbs. per acre. This solution is prepared from an aliquot of a 2 percent solution of the candidate compound in acetone, a known amount of cyclohexanone-emulsifying agent mix, and sufficient water to make up to volume. The emulsifying agent is a mixture comprising 35 wt. percent butylamine dodecylbenzene sulfonate and 65 wt. percent of a tall oil-ethylene oxide condensate having about 6 moles of ethylene oxide per mole of tall oil. The injuries to the plants are then observed approximately 14 days later and the results are recorded.

Contact herbicidal activity of the compound prepared in Example 2 is observed against downy brome, quackgrass, Canada thistle, lambsquarter and cocklebur.

EXAMPLE 35

Pre-emergent herbicidal activity of representative compounds of this invention is determined by the following procedure:

A good grade of top soil is placed in aluminum pans and compacted to a depth of three-eighths to one-half inch from the top of the pan. A pre-determined number of seeds of each of several plant species are placed on top of the soil in the pans. The seeds are covered with soil and the pans leveled. The herbicidal composition is applied by spraying the surface of the top layer of soil with a solution containing a sufficient amount of active ingredient to obtain a rate of application of 5 lbs. per acre. The pans are then placed on a sand bench in the greenhouse and watered from below as needed. The plants are observed at the end of approximately 14 days and the results recorded.

Pre-emergent activity of the compound prepared in Example 1 is observed against downy brome.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. A 2,6-diorgano-1,5-dithia-2,6-diazacyclooctane-3,4,7,8-tetraone of the formula

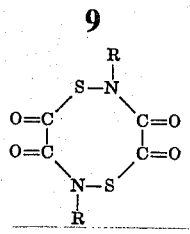

wherein R is alkyl of from one to six carbons, alkoxyalkyl of from two to eight carbons, benzyl, phenyl, substituted phenyl wherein the ring substituents thereof total from one to three same or different substituents selected from the group of substituents consisting of alkyl of from one to six carbons, lower alkoxy, halo, nitro, cyano, and trihalomethyl, provided that the number of nitro substituents be from 0 to 2, and provided that the number of said substituents in the 2 and 6 positions on the ring be from 0 to 1, substituted benzyl wherein the substituents are in any position on the phenyl ring but otherwise as defined for substituted phenyl.

2. The compound of claim 1 wherein R is phenyl.
3. A compound of claim 1 wherein R is substituted phenyl.
4. A compound of claim 3 wherein R is halophenyl.
5. A compound of claim 4 wherein the halo is chlorine.
6. The compound of claim 5 wherein R is parachlorophenyl.
7. A compound of claim 4 wherein the halo is bromine.
8. A compound of claim 3 wherein R is trihalomethyl phenyl.
9. The compound of claim 8 wherein R is meta-(trifluoromethyl)phenyl.
10. A compound of claim 3 wherein the ring substituents are alkyl of from one to six carbons.
11. A compound of claim 1 wherein R is substituted benzyl.
12. A compound of claim 1 wherein R is alkyl of from one to six carbons.
13. A compound of claim 1 wherein R is alkoxyalkyl of from two to eight carbons.
14. A method for the preparation of a 2,6-diorgano-1,5-dithia-2,6-diazacyclooctane-3,4,7,8-tetraone of the formula

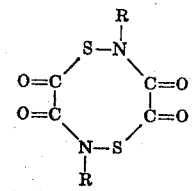

wherein R is alkyl of from one to six carbons, alkoxyalkyl of from two to eight carbons, benzyl, phenyl, substituted phenyl wherein the ring substituents thereof total from one to three same or different substituents selected from the group of substituents consisting of alkyl of from one to six carbons, lower alkoxy, halo, nitro, cyano, and trihalomethyl, provided that the number of nitro substituents be from zero to two, and provided that the number of said substituents in the two and six positions on the ring be from zero to one, substituted benzyl wherein the substituents are in any position on the phenyl ring but otherwise as defined for substituted phenyl which comprises eliminating hydrogen chloride from an oxamoyl sulfenyl chloride of the formula

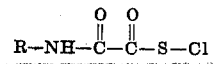

wherein R has the aforementioned significance, in the presence of an HCl scavenger.

15. A method of claim 14 wherein the HCl scavenger is sodium bicarbonate dissolved in water.
16. A method of claim 14 wherein the HCl scavenger is trialkylamine.

* * * * *